July 7, 1936. R. S. COCHRAN ET AL Re. 20,028
WALKING BEAM FURNACE
Original Filed Aug. 31, 1934 6 Sheets-Sheet 1
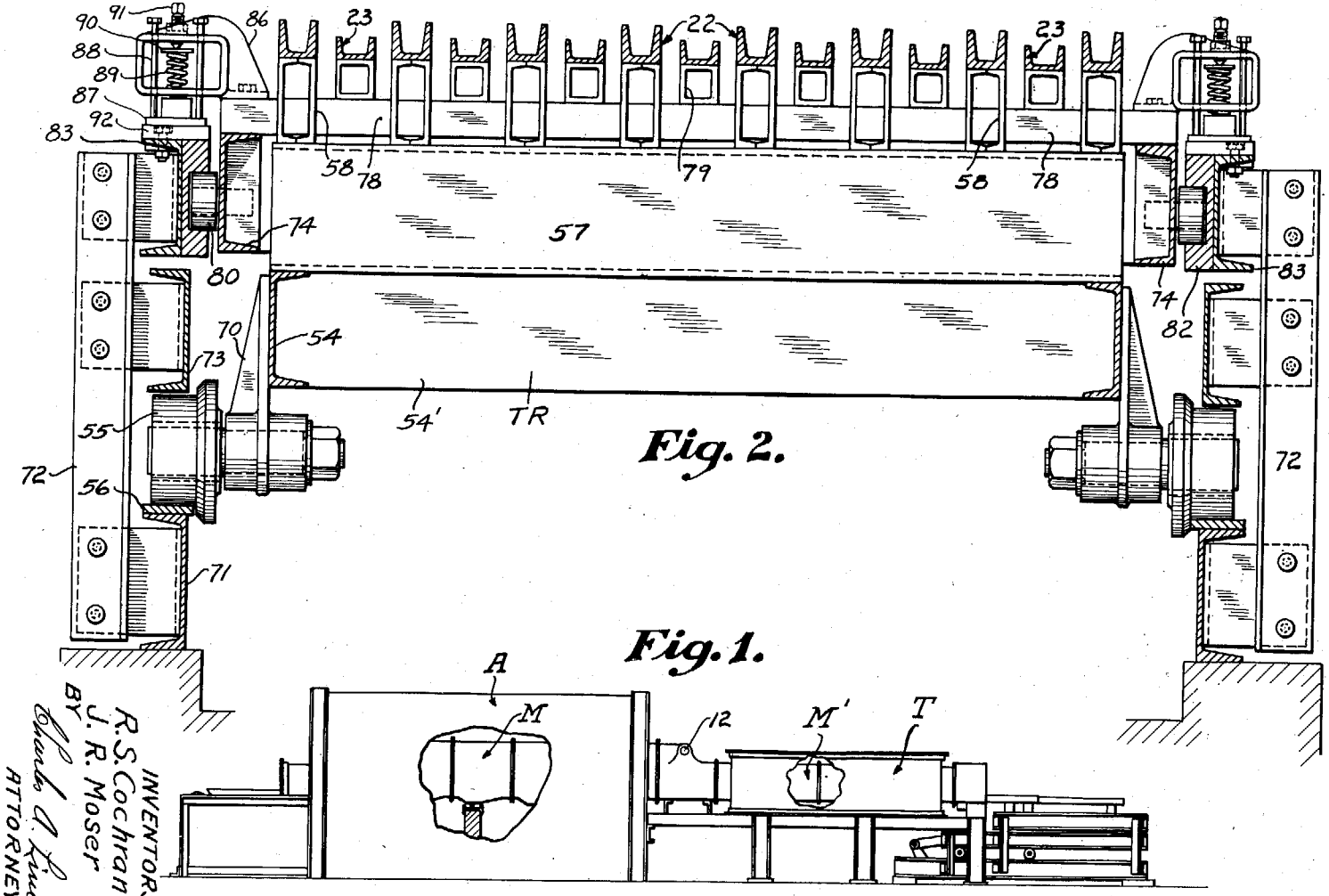

July 7, 1936. R. S. COCHRAN ET AL Re. 20,028

WALKING BEAM FURNACE

Original Filed Aug. 31, 1934 6 Sheets-Sheet 2

INVENTORS:
R. S. Cochran
J. R. Moser
BY Charles A. Lind
ATTORNEY.

July 7, 1936. R. S. COCHRAN ET AL Re. 20,028
WALKING BEAM FURNACE
Original Filed Aug. 31, 1934 6 Sheets-Sheet 3
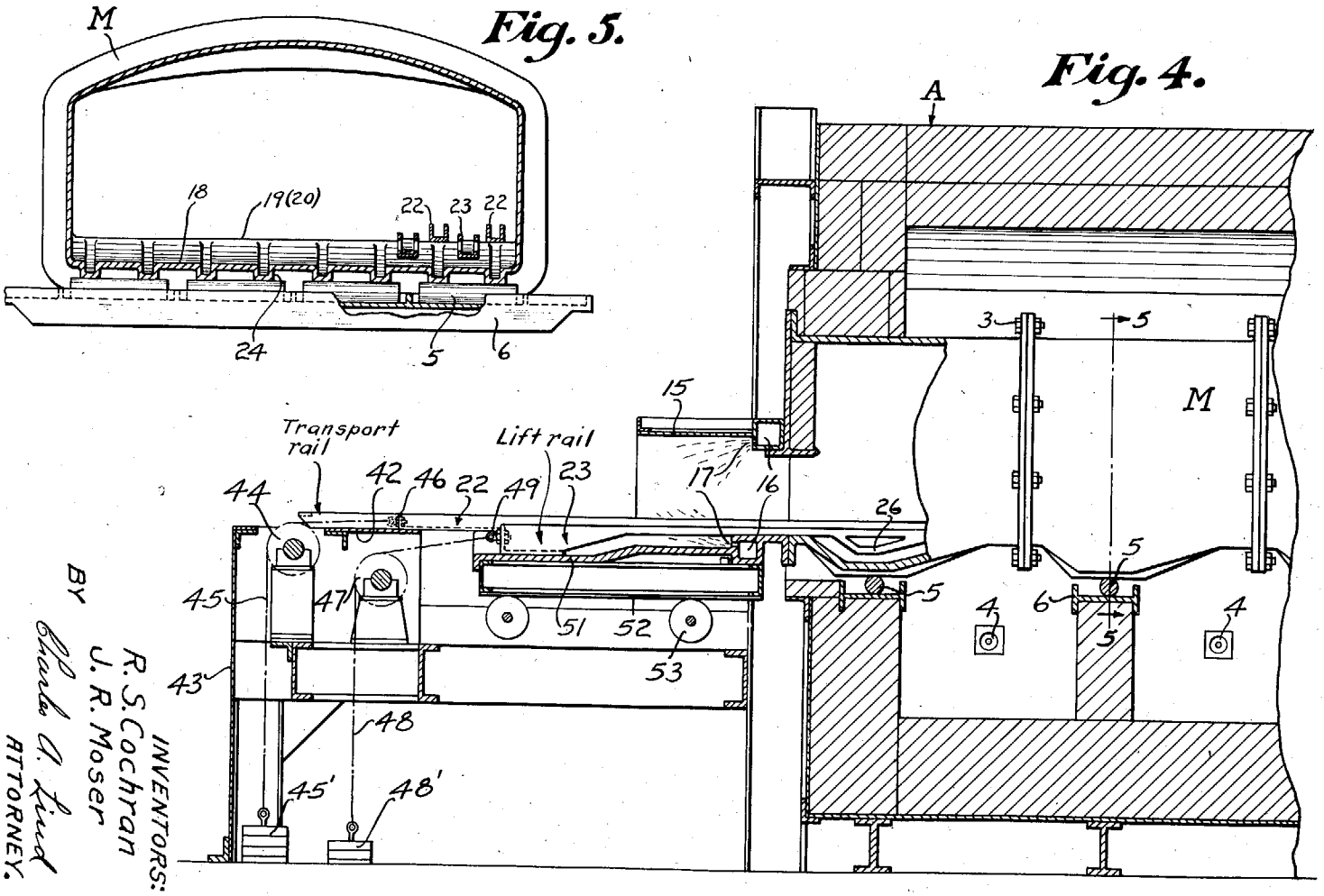
INVENTORS:
R. S. Cochran
J. R. Moser
BY
Charles A. Lind
ATTORNEY.

WALKING BEAM FURNACE

Original Filed Aug. 31, 1934 6 Sheets-Sheet 4

INVENTORS:
R. S. Cochran
J. R. Moser
BY
Charles A. Lind
ATTORNEY.

WALKING BEAM FURNACE

Original Filed Aug. 31, 1934 6 Sheets-Sheet 5

INVENTORS:
R. S. Cochran
J. R. Moser
BY
Charles A. Lind
ATTORNEY.

WALKING BEAM FURNACE

Original Filed Aug. 31, 1934 6 Sheets-Sheet 6

INVENTORS:
R. S. Cochran
J. R. Moser
BY
Charles A. Lind
ATTORNEY.

Reissued July 7, 1936 Re. 20,028

UNITED STATES PATENT OFFICE 20,028

WALKING BEAM FURNACE

Ralf S. Cochran and Jesse R. Moser, Toledo, Ohio, assignors to Surface Combustion Corporation, Toledo, Ohio, a corporation of New York Original No. 2,017,024, dated October 8, 1935, Serial No. 742,295, August 31, 1934. Application for reissue December 11, 1935, Serial No. 53,961

11 Claims. (Cl. 263—6)

This invention relates to continuous heat-treating furnaces of the muffle type and has for its general object to provide improved means for conveying the work to be heat-treated through the muffle. More particularly the invention has among its objects to provide a reciprocating rail type conveyor for moving the work through the muffle in a series of steps; to provide means for supporting and operating the conveyor in such a manner as not to require operating openings in the floor or roof or side walls of the muffle; to provide means for compensating for the expansion and contraction of the muffle and the conveyor rails; to provide means for maintaining the rails under tension; to provide means for counteracting any tendency of the rails to warp vertically under heat; to provide relatively simple means for longitudinally reciprocating the lift rails of the conveyor through a shorter stroke than the transport rails; to provide relatively simple means for preventing air from entering the open ends of the muffle, and generally to provide a furnace of the type indicated which shall be well adapted for its intended purpose.

Referring to the drawings wherein the preferred form of the invention is shown,—

Fig. 1 is a more or less diagrammatic side elevation of the furnace as a whole with portions of the side walls omitted to expose portions of the muffle;

Fig. 2 is a cross section on line 2—2 of Fig. 3;

Fig. 4 is a side section of the charge end of the furnace;

Fig. 5 is a cross section on line 5—5 of Fig. 4 except that some of the conveyor rails are omitted;

Figure 7:
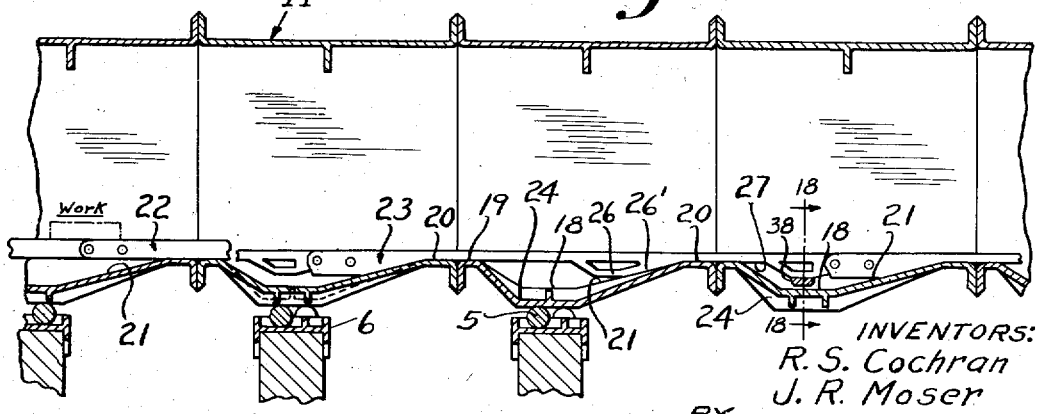
Fig. 7 is a vertical longitudinal section through a portion of the muffle and showing the position of the transport and lift rails of the conveyor when the work is supported on the transport rails.
Figure 11:
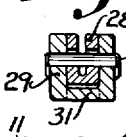
Figure 13:
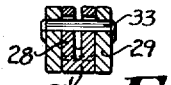
Figure 12:
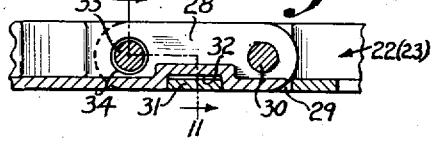
Figure 14:
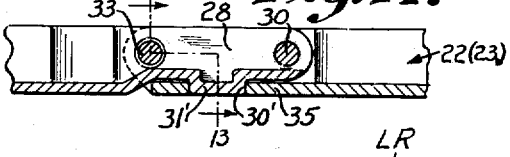
Figure 16:
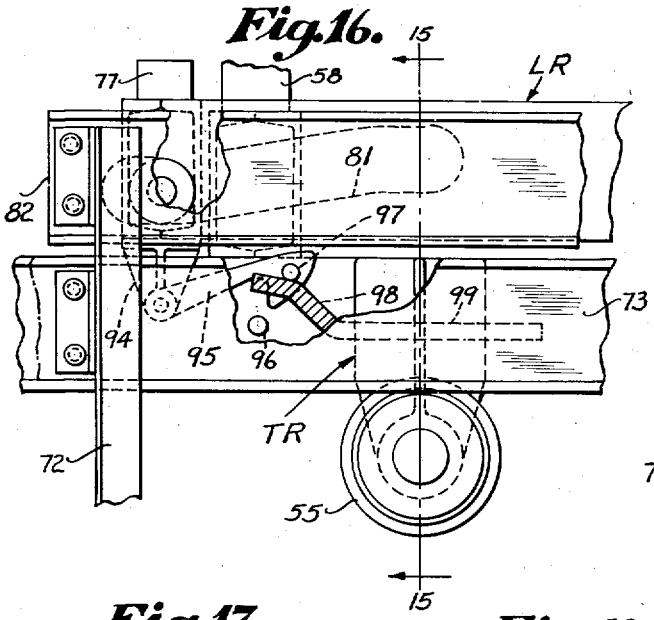
Figure 15:
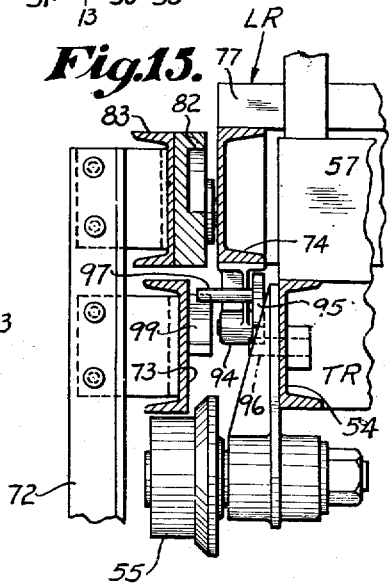
Figure 17:
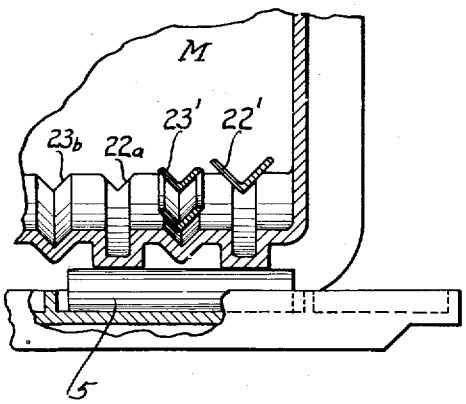
Figure 18:
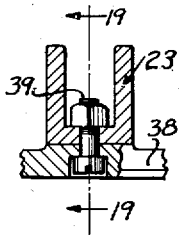

Fig. 11 relates to a detail of the conveyor rails and is a section on line 11—11 of Fig. 12;

Fig. 12 is a sectional view of the parts shown in Fig. 11;

Fig. 13 relates to a modification of the detail shown in Figs. 11 and 12 and is a section on line 13—13 of Fig. 14;

Fig. 14 is a sectional view of the parts shown in Fig. 13;

Fig. 15 is a fragmentary vertical cross section of a modified form of mechanism associated with the means for operating the conveyor;

Fig. 16 is a side elevation of Fig. 15;

Fig. 17 is a fragmentary vertical cross section of the muffle showing the floor thereof as slightly modified as compared with Fig. 5 to accommodate conveyor rails which are of V form instead of rectangular in cross section;

Fig. 18 is a cross section on line 18—18 of Fig. 7, and

Figure 19:
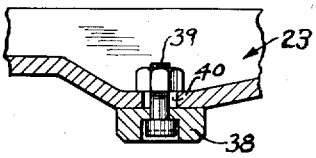

Fig. 19 is a vertical section on line 19—19 of Fig. 18.

The combustion chamber of the furnace comprises the usual box-type structure generally indicated at A. The muffle is generally indicated at M and is extended, as indicated at M', to form a cooling chamber which is shown as passing through a water tank T; the cooling chamber and the tank being supported on a suitable framework 7 and 8. The muffle is movably mounted in the combustion chamber for longitudinal expansion and contraction and to this end is supported on rollers 5 which run on appropriately supported tracks 6. The combustion chamber is fired by any suitable burners 4 shown as arranged in the side walls thereof.

In many heat treating operations, it is desirable to maintain a special atmosphere in the muffle. To this end, the present muffle is provided with an inlet 12 intermediate its ends outside of the combustion chamber for the admission of the gas which is to constitute the special atmosphere. By thus admitting the gas intermediate the ends of the muffle, the gas stream will divide and flow toward the said ends. It is, of course, desirable to control the relative volumes of the gas so flowing toward the opposite ends of the muffle and to this end there is provided at each end a suitable means for controlling the flow. These means are severally substantially the same and a description of one will therefore suffice for the other, the corresponding parts being identified by the same reference numerals except that one set of numerals is primed. Referring to Fig. 4, it will be seen that the muffle is extended by a relatively short section 15, the roof of which is at a considerably lower level than the roof of the muffle, thereby forming a relatively restricted passage from the muffle. Formed in the top and bottom walls of this extension are upper and lower transversely extending passages 16 each provided with a series of horizontally extending jet orifices 17 which face outwardly. Air or any other suitable gas under pressure is delivered to the passages 16 by supply pipes not shown. The air or gas discharged from the jet orifices sets up a suction effect which induces the gases in the muffle to flow outwardly through the open ends of the muffle and counteracts any tendency of atmospheric air to enter the muffle.

The work to be heat-treated is transported through the muffle by a reciprocating conveyor which is supported on the floor of and which extends beyond the ends of the the muffle. It is a feature of the present invention that the conveyor does not require any operating openings in the floor or roof or side wall of the muffle, thus eliminating potential points of entry of outside air into the muffle. The floor of the muffle (including the cooling section M') is of hill and dale form whereby to provide a series of upper level floor seats 19 and 20 in a common level; a series of low level floor portions 18 and a series of inclined seats or ramps 21 between the seats 20 and the low level portions 18.

That portion of the muffle which is inside of the combustion chamber preferably comprises a series of relatively short sections of cast heat-resisting alloy, the sections being secured end to end in gas-tight relation as by bolts 3 passing through flanges at the ends of the sections. The cooling section of the muffle may be constructed of ordinary steel plates with the floor thereof of the same form as in the high temperature portion of the muffle.

The conveyor comprises a group of transport rails 22 which are arranged for longitudinal but not vertical reciprocation and a group of lift rails 23 which are arranged for both longitudinal and vertical reciprocation. All of these rails extend in parallel relation, the lift rails being interdigitated with the transport rails. The transport rails are at all times supported on the elevated floor seats 19 and 20. The lift rails are also supported on said seats when they are in their uppermost and lowermost levels with respect to the transport rails, but when they move from one level to the other they are supported on the floor ramps 21. The underside of each lift rail comprises a series of horizontally extending portions 26 and 27 at different levels, the two levels being connected by inclined portions 26' having the same slope as the floor ramps 21. When the lower level portions 26 rest on the elevated seats 20 of the muffle floor, the top of the lift rails will be above the top of the transport rails whereas when the upper level portions 27 rest on said seats, the top of the lift rails will be below the top of the transport rails. For convenience of description the lower level portions 26 of the lift rails will sometimes be referred to as "heels" and the upper level portions 27 as "shoes".

Figure 8:
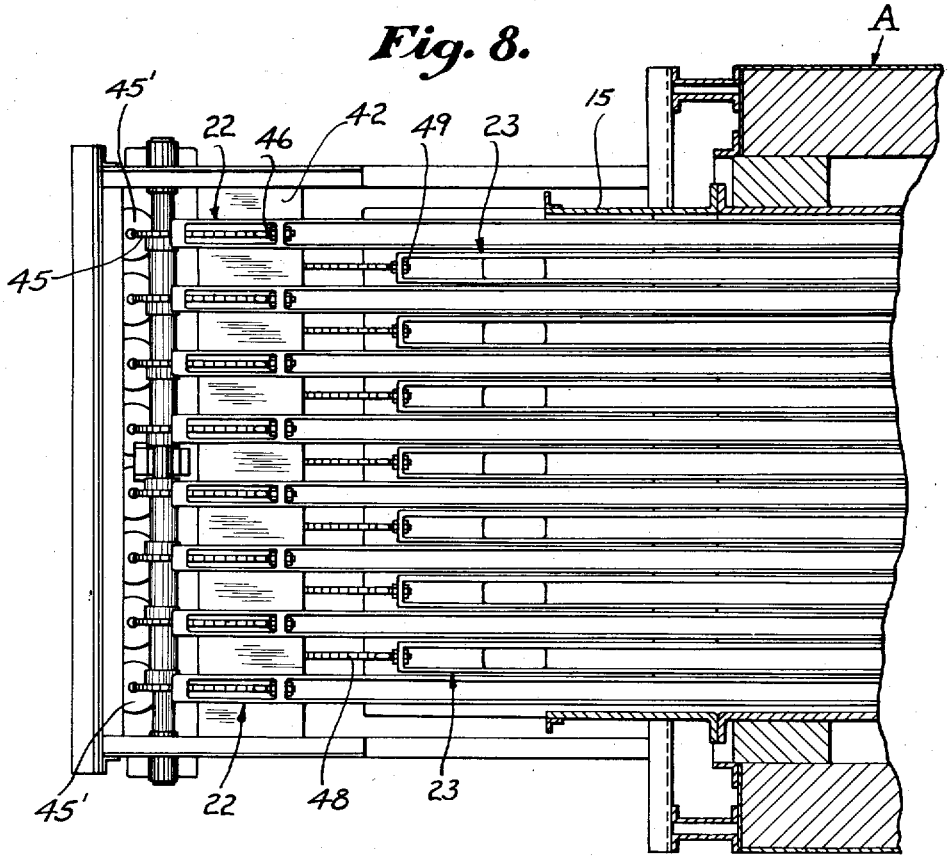
Fig. 8 is a plan view of the charging end of the furnace.

The charging or work-entering end of the furnace is shown in Figs. 4 and 8. The transport rails 22 extend beyond the lift rails 23 and rest on a shelf or platform 42 supported on a framework 43. Both sets of rails are shown at their limit of movement toward the left, the lift rails in this position being below the level of the transport rails. Supported on the framework 43 is a series of pulleys 44, there being one pulley for each of the transport rails 22. Trained over each pulley is a cable 45 one end of which is anchored as at 46 to that transport rail which is in alignment with the pulley, the other end supporting a weight 45'. A similar arrangement of pulleys, cables and weights is provided for the lift rails, the pulleys being indicated at 47, the cables at 48, the weights at 48', and the cable anchorages at 49. The individual rails are therefore subjected to a pull or tension which tends to straighten them in case they should warp under heat.

Figure 3:
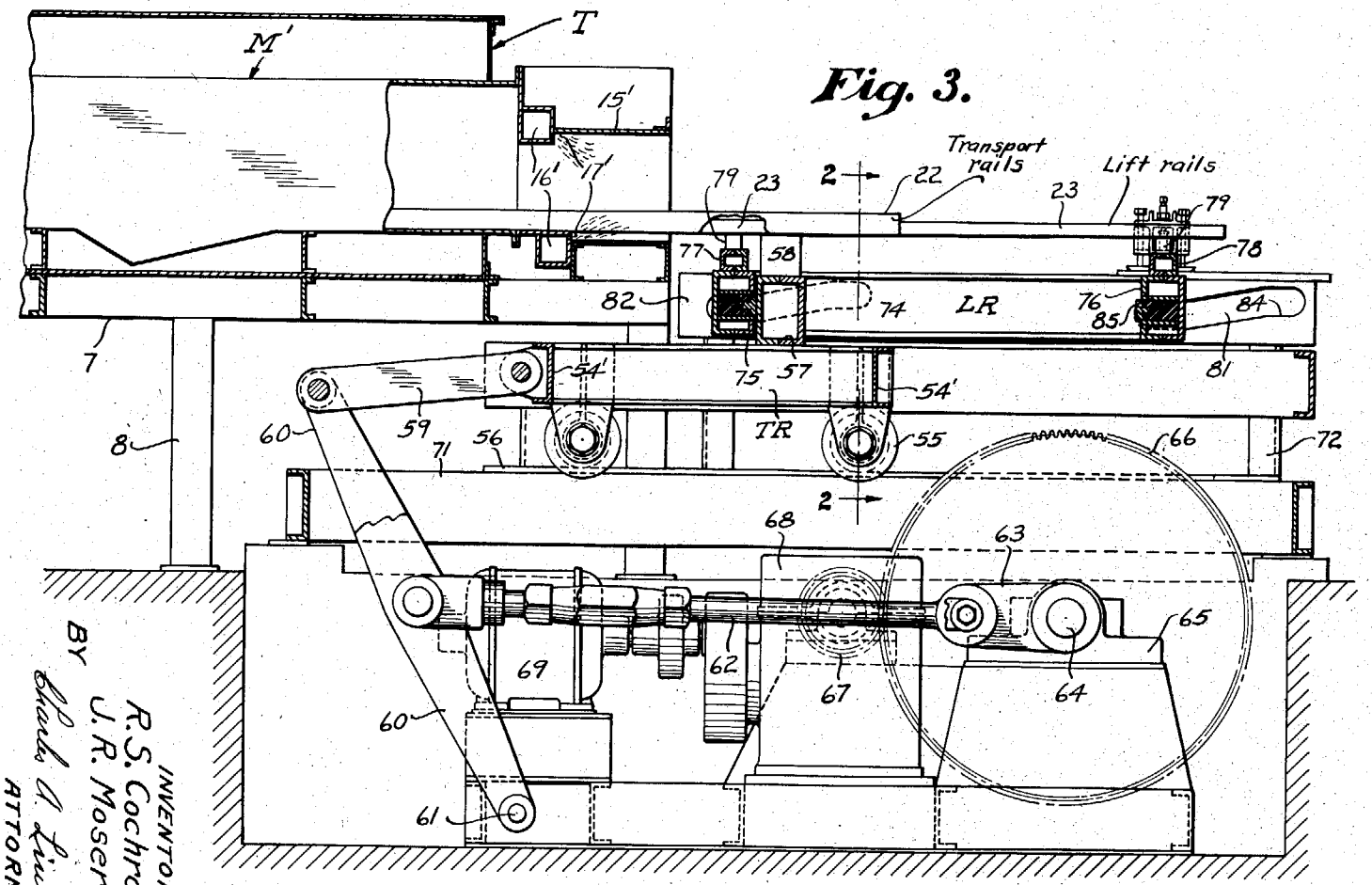
Fig. 3 is a side section of the discharge end of the furnace and showing the means for operating the conveyor.
Figure 6:
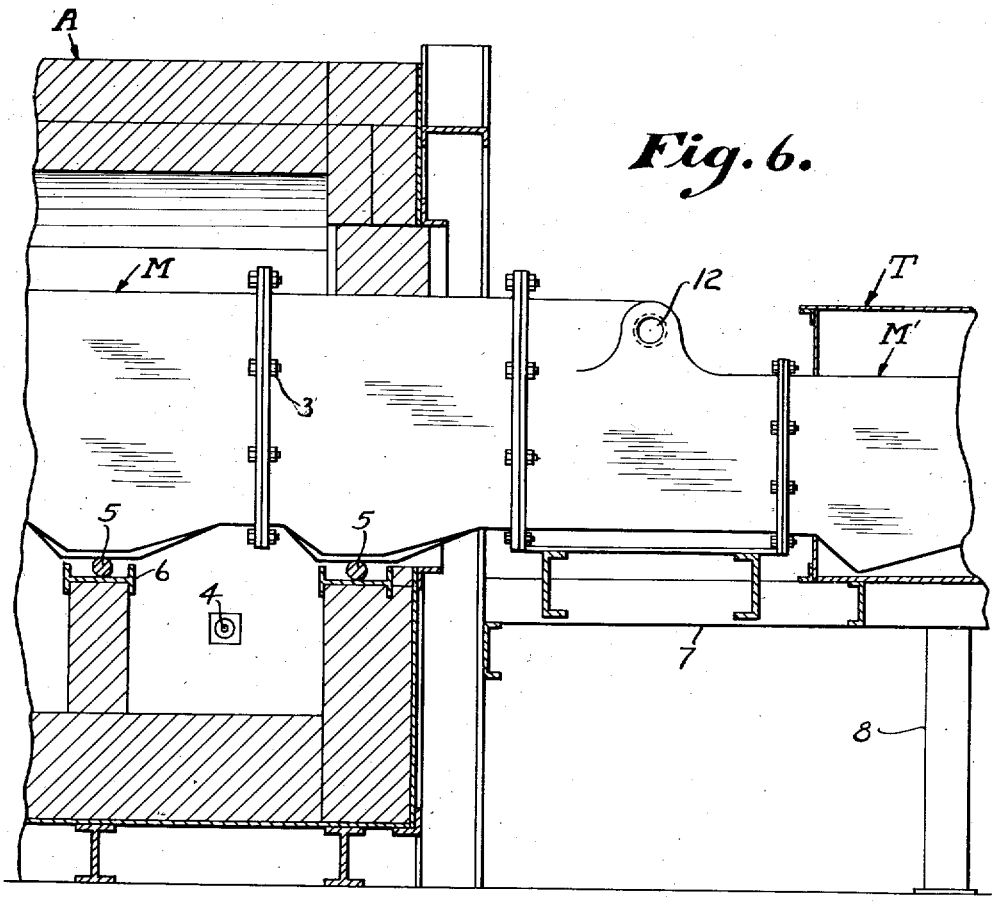
Fig. 6 is a side section of an intermediate portion of the furnace.

The mechanism for reciprocating the rails will next be described. Referring more particularly to Figs. 2 and 3, it will be noted that the lift rails are below the top level of the transport rails and extend beyond the latter. Both sets of rails are shown in their left-hand limit of movement as viewed in Fig. 3. The transport rails are anchored to a wheeled rectangular carriage generally indicated at TR, its sides being indicated at 54 (Fig. 2), its ends at 54', its wheels at 55, and the tracks on which the wheels run at 56. The connection between the rails 22 and the carriage comprises a cross beam 57 fixedly secured to the top side of the carriage, stools or pedestals 58 fixedly secured to the top side of the cross beam, the rails being fixedly secured to the top side of the stools, there being one stool for each rail. The carriage and rails are therefore longitudinally movable as a unit. The carriage wheels 55 are conveniently carried by brackets 70 secured to the side beams 54 of the carriage. The tracks 56 on which the wheels run are supported on longitudinal beams 71 secured to an upright framework 72. In order to prevent upward displacement of the carriage, there may be provided above the wheels a thrust track 73 comprising a longitudinal beam also secured to the upright framework 72.

Figure 9:
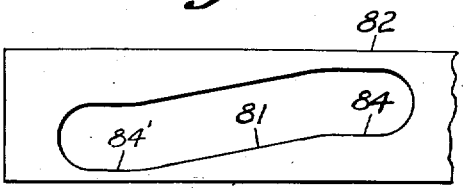
Fig. 9 is fragmentary side view of a detail associated with the conveyor mechanism.
Figure 10:
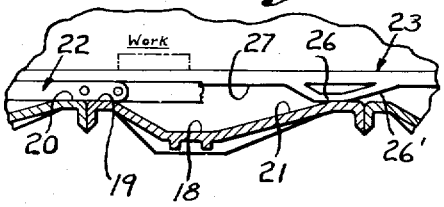
Fig. 10 is a fragmentary view similar to Fig. 7, but showing the position of the transport and lift rails of the conveyor when the work is supported on the lift rails.

The lift rails 23 are anchored to a rectangular carriage generally indicated at LR, its sides being indicated at 74, and its opposite ends at 75 and 76. The connection between the rails and the carriage comprises two spaced crossbeams 77 and 78 fixedly secured to the top side of the carriage, a series of stools 79 fixedly secured to the top side of said cross beams, the rails being fixedly secured to the top side of said stools. The lift rails 23 and their carriage LR are therefore movable as a unit. The carriage is provided with four guide wheels or rollers 80, two at each side. Cooperating with each roller is an inclined track 81 in the form of a slot in a plate bar 82 secured to a longitudinal beam 83 supported by the framework 72. The incline of the track or slot is the same as the incline of the floor ramps 21 of the muffle. At each end of the slot is a level track portion, the upper level portion being indicated at 84 and the lower level portion at 84'. (See Fig. 9).

The length of the stroke of the lift rail carriage LR is substantially the same as the combined lengths of the inclined slot 81 and the horizontal end portions 84 and 84' associated therewith. When the transport carriage TR moves to the right from the position shown in Fig. 3, the lift rail carriage LR remains stationary until the cross beam 57 of the carriage TR abuts the cross beam 76 of the carriage LR. Thereupon the carriage LR moves along with the carriage TR until the latter reaches the end of its stroke. During this right-hand movement of the carriage LR, the lift rails will have been moved from their lowermost to their uppermost level with consequent transfer of the work from the transport rails to the lift rails. When the transport carriage TR begins its return stroke toward the left, the lift carriage LR remains stationary until the cross beam 57 of the carriage TR abuts the other cross beam 75 of the carriage LR. Thereupon the carriage LR moves along with the carriage TR until the latter reaches the end of its stroke.

During this left-hand movement of the carriage LR, the lift rails will have been moved from their highermost to their lowermost level with consequent transfer of the work from the lift rails 23 to the transport rails 22. Thereafter, the carriage TR begins its return stroke to the right and the cycle is repeated as explained. To cushion the impact between the cross beam 57 and the end beams 75 and 76, the last named beams may be provided with any suitable buffer 85 shown as comprising a block of rubber.

The carriage TR may be reciprocated by any suitable mechanism but preferably by means comprising a link 59 connected to one end of said carriage, a lever 60 connected at its upper end to the link and pivotally mounted at its lower end to a fixed support 61, a connecting rod 62 extending from a point intermediate the end of the lever to a crank 63 on the drive shaft 64 supported in a pillow block 65 and a gear wheel 66 on the shaft. In mesh with the gear wheel is a pinion 67 associated with a speed reducer generally indicated at 68, the prime mover being a motor 69 suitably coupled to the speed reducer.

In order to prevent the carriage LR from moving from its uppermost to its lowermost level at a rate faster than the carriage TR, there may be provided a friction device of the type shown in Figs. 2 and 3. This device comprises an upstanding and laterally extending bracket 86 fixedly secured at the outer end on the top side cross beam 78 of the carriage LR, a vertically movable friction shoe 87 which is guided in its vertical movement by guide rods 88 which extend through upper and lower head walls of the bracket, and a coil spring 89 which at its lower end rests on the top of the shoe 87 and at its upper end against a plate 90 which in turn bears against the lower end of a vertical adjusting screw 91 supported in the upper head wall of the bracket.

The shoe 87 is arranged to ride on a wear plate 92 secured to the top side of the longitudinal beam 83 secured to the framework 72. When the carriage LR moves downwardly, it will be readily appreciated that the pressure exerted on the shoe by the spring 89 increases as the carriage LR moves downwardly. The friction thus set up between the shoe 87 and the wear plate 92 will ordinarily be sufficient to prevent the carriage LR from moving down the incline 81 too rapidly. However, instead of relying on friction to restrain the carriage LR, means may be provided for interlocking the two carriages while the carriage LR is moving from its upper to its lower level and an example of such locking means is shown in Figs. 15 and 16.

Referring to the construction shown in Figs. 15 and 16, 94 indicates a bracket fixedly secured to the lower side of the side beam 74 of the carriage LR. Hinged on this bracket is a latch 95. Extending laterally from the side beam 54 of the carriage TR is a pin 96. When the latch 95 is hooked on the pin 96, the carriage LR is positively coupled to the carriage TR. In Figs. 15 and 16 the carriage LR is shown at its lowermost level and the carriage TR at the limit of its stroke to the left. In this position of the carriages, the latch is unhooked from the pin 96 in order that the carriage TR may move to the right without initially moving the carriage LR with it. The latch is disengaged from the pin 96 by providing the head of the latch with a laterally extending wiper pin 97 and by securing to the fixed beam 73 comprising part of framework 72, a cam track on which the wiper pin rides. This cam track comprises an inclined portion 98 and a horizontal portion 99 extending from the foot of the incline. As the carriage LR approaches its limit of movement to the left, the wiper pin 97 will travel up the incline 98 and thus unhook the latch from the pin 96.

Assuming now that both carriages are at their limit of movement to the right. In this position the wiper pin 97 rests on the horizontal portion 99 of the cam track and the head of the latch is in the path of travel of the pin 96 of the carriage TR. As the carriage TR moves to the left, its pin 96 engages and rides under the head of the latch until the hook part of the latch has been reached, whereupon the latch drops down and hooks on the pin. By the time the latch has hooked on the pin, the cross beam 57 of the carriage TR will have abutted the cross piece 75 of the carriage LR, whereupon the two carriages move together toward the left to the end of the stroke of the carriage TR, the latch becoming unhooked from the pin 96 before the limit of the stroke is reached as already explained.

The rails in the high temperature section of the muffle are made of cast heat-resisting alloy and it is a feature of the present invention that both the lift and transport rails are relatively flexible or limp vertically in order to counteract any tendency of the rails to warp upwardly under heat. In accordance with the present invention, each rail in the high temperature portion of the muffle comprises a plurality of relatively short sections coupled end to end, the coupling preferably being of such construction as to permit limited hinging action between adjacent sections, the sections being of a length at least as great as the distance between three of the lower level floor portions 18 to insure that each section shall always be properly supported. In the preferred type of joint, one end of each section is in the form of a tongue and the other in the form of a groove to receive the tongue. The preferred form of joint is shown in Figs. 11 and 12. The tongue is indicated at 28 and the two side walls comprising the groove at 29. A hinge pin 30 extends through the side walls 29 and through the outer end of the tongue.

In order to reduce wear on the hinge pin to a minimum and to strengthen the joint, means independent of the hinge pin are provided for taking the longitudinal push and pull between the rail sections. This means preferably comprises a cross piece 31 which extends between the side walls 29 of the groove at the lower side thereof, the underside of the tongue 28 being upwardly recessed as indicated at 32 to receive the cross piece, the recess being sufficiently high to allow a limited upward hinging action between the rail sections. In order to limit the degree of hinging in the other direction, there is provided a pin 33 which extends through the side walls 29 of the groove in and through the tongue 28, but the hole in the tongue through which the pin passes is of considerably greater diameter than the diameter of the pin as indicated at 34.

A slightly modified form of coupling is shown in Figs. 13 and 14. In this form of joint, the push and pull between the rail sections is taken by a lug 31' which extends downwardly from the bottom side of the tongue into an aperture 30' and in a bottom plate 35 which extends between the side walls 29 of the tongue at the lower side thereof. Otherwise the construction is the same as the other coupling.

The transport and lift rails may or may not be confined against lateral movement on their seats in the muffle. When they are not laterally confined, the upper level seats 19 and 20 will be flat crosswise of the muffle as shown in Fig. 5. When the lift rails are not laterally confined on their seats, it is preferred to maintain them in laterally spaced relation by a series of cross bars 38 (see Fig. 18) connected to the underside of the rails in a manner to permit such relative longitudinal movement between the rails as may be occasioned by unequal expansion of the individual rails. To this end the cross bars are secured to the rails by bolts 39 which are not drawn up so tight as to prevent relative movement between the cross bar and the rail, the bolt passing through a slot 40 which extends lengthwise of the rail. As shown in Fig. 5, the rails are preferably of U shape or channel form in cross section, the underside being flat crosswise.

When it is desirable that the lift and transport rails be confined against lateral movement on their seats in the muffle, it is preferred that each rail be V shape in cross section and that the muffle floor be correspondingly modified. The preferred construction is shown in Fig. 17. In this view, 22' indicates the transport rail and 23' the lift rail. The seat for the transport rail is indicated at **22*a* and the seat for the lift rail at 23*b***. It will, of course, be understood that the heels and inclined portions at the underside of each lift rail will also be V shape. When the rails are V shape in cross section, they may conveniently be of angle form as shown.

It will be noted that the conveyor is operated in such a manner that the lift rails carry the work forward a certain distance and then backward the same distance, but since the stroke of the transport rails is greater than that of the lift rails the net result is progressively forward movement of the work.

What we claim as new and desire to secure by Letters Patent is:

1. A furnace comprising in combination, a support, a tunnel fixedly secured to said support and extending therebeyond, a second support on which the projecting end of a tunnel is movably supported, a firing chamber surrounding the movably supported part of the tunnel, two sets of rails movably supported on the floor of the tunnel, means adjacent the movably supported end of the tunnel for exerting outward pull on the rails, and means at the other end of the tunnel for reciprocating said rails.

2. A furnace comprising, in combination, a tunnel through which work is passed for treatment, a pair of reciprocable carriages at one end of the tunnel outside of the same, rails anchored to the respective carriages and extending into the tunnel, means for reciprocating the carriages through different length strokes, and means for locking said carriages in one direction of movement of the carriages.

3. A furnace comprising in combination, a support, a tunnel fixedly secured to said support and projecting therebeyond, a second support on which the projecting end of the tunnel is movably supported, a conveyor comprising two sets of interdigitated rails all supported on the floor of the tunnel, the one set for horizontal reciprocation only and the other set for both vertical and horizontal reciprocation, means for maintaining pull on the several rails, and means independent of such means for reciprocating the nonvertically movable rails through a longer stroke than the other rails.

4. A furnace comprising, in combination, a tunnel wherethrough material is passed for treatment, a conveyor for said material and comprising two sets of interdigitated rails all of which extend longitudinally through the tunnel, power-actuated means for longitudinally reciprocating one set of said rails, means interconnected with said means for automatically moving the other set of said rails in the same longitudinal direction as and in unison with the said one set of rails for a distance less than the length of the stroke of the said one set of rails, one end of said distance being at one end of said stroke and the other end of said distance being at the other end of said stroke, a mounting permitting the said other set of rails to move in a direction inclined to the vertical when moved with the said one set of rails as said, and the said one set of rails being mounted for longitudinal reciprocation only.

5. A furnace comprising, in combination, a tunnel wherethrough material is passed for treatment, a conveyor for said material and comprising two sets of interdigitated rails all of which extend longitudinally through the tunnel, power-actuated means for longitudinally reciprocating one set of said rails, means interconnected with said means for automatically moving the other set of said rails in the same longitudinal direction as and in unison with the said one set of rails for a distance less than the length of the stroke of the said one set of rails, one end of said distance being at one end of said stroke and the other end of said distance being at the other end of said stroke, a mounting permitting the said other set of rails to move in a direction inclined to the vertical when moved with the said one set of rails as said, the said mounting comprising a series of parallel ridges and depressions crosswise of the tunnel, and the said one set of rails being continuously supported by said ridges for longitudinal reciprocation only.

6. A furnace comprising, in combination, a tunnel wherethrough material is passed for treatment, a conveyor for said material and comprising two sets of interdigitated rails all of which extend longitudinally through the tunnel, power-actuated means for longitudinally reciprocating one set of said rails, means interconnected with said means for automatically moving the other set of said rails in the same longitudinal direction as and in unison with the said one set of rails for a distance less than the length of the stroke of the said one set of rails, one end of said distance being at one end of said stroke and the other end of said distance being at the other end of said stroke, a mounting permitting the said other set of rails to move in a direction inclined to the vertical when moved with the said one set of rails as said, means individual to each of the rails of the said one set of rails for exerting longitudinal pull on such rails in a direction away from the carriage to which such rails are secured, and the said one set of rails being mounted for longitudinal reciprocation only.

7. A furnace comprising, in combination, a tunnel wherethrough material is passed for treatment, a conveyor for said material and comprising two sets of interdigitated rails all of which extend longitudinally through the tunnel, power-actuated means for longitudinally reciprocating one set of said rails, means interconnected with said means for automatically moving the other set of said rails in the same longitudinal direction as and in unison with the said one set of rails for a distance less than the length of the stroke of the said one set of rails, one end of said distance being at one end of said stroke and the other end of said distance being at the other end of said stroke, a mounting permitting the said other set of rails to move in a direction inclined to the vertical when moved with the said one set of rails as said, means individual to each of the rails of the said other set of rails for exerting longitudinal pull on such rails in a direction away from the carriage to which such rails are secured, and the said one set of rails being mounted for longitudinal reciprocation only.

8. A furnace comprising, in combination, a tunnel wherethrough material is passed for treatment, a conveyor for said material and comprising two sets of interdigitated rails all of which extend longitudinally through the tunnel, power-actuated means for longitudinally reciprocating one set of said rails, means interconnected with said means for automatically moving the other set of said rails in the same longitudinal direction as and in unison with the said one set of rails for a distance less than the length of the stroke of the said one set of rails, one end of said distance being at one end of said stroke and the other end of said distance being at the other end of said stroke, a mounting permitting the said other set of rails to move in a direction inclined to the vertical when moved with the said one set of rails as said, and the said one set of rails being mounted for longitudinal reciprocation only, a firing chamber through which said tunnel extends, means inside of said chamber for supporting said tunnel for thermal expansion and contraction, and the said mounting for the said other set of rails being inside of said tunnel and independent of the said chamber.

9. In combination, a furnace chamber, and means for conveying objects therethrough comprising two reciprocable conveying members of which one has a longer reciprocating stroke than the other, means for continuously reciprocating the long stroke member, means for moving the short stroke member along with the long stroke member after the latter has traveled a distance equal to the difference in the length between the said strokes, and means for causing the short stroke member to move from a lower to a higher level and vice versa in moving back and forth between the ends of its stroke.

10. In combination, a furnace chamber, and means for conveying objects therethrough comprising two reciprocable conveying members of which one has a longer reciprocating stroke than the other, means for continuously reciprocating the long stroke member, means for moving the short stroke member along with the long stroke member after the latter has traveled a distance equal to the difference in the length between the said strokes, and means including a platform on which both of said members are supported for causing the short stroke member to move from a lower to a high level and vice versa in moving back and forth between the ends of its stroke.

11. In combination, a furnace chamber, and means for conveying objects therethrough comprising two reciprocable conveying members of which one has a longer reciprocating stroke than the other, means for continuously reciprocating the long stroke member, means for moving the short stroke member along with the long stroke member after the latter has traveled a distance equal to the difference in the length between the said strokes, means for causing the short stroke member to move from a lower to a higher level and vice versa in moving back and forth between the ends of its stroke, and means for maintaining at least one of said members under tension.

RALF S. COCHRAN.
JESSE R. MOSER.